United States Patent
Momono

(10) Patent No.: US 9,908,809 B2
(45) Date of Patent: Mar. 6, 2018

(54) CRYSTALLIZED GLASS AND CRYSTALLIZED GLASS SUBSTRATE

(71) Applicant: OHARA INC., Sagamihara-shi, Kanagawa (JP)

(72) Inventor: Kiyoyuki Momono, Sagamihara (JP)

(73) Assignee: OHARA INC., Sagamihara-Shi, Kanagawa (JP)

( * ) Notice: Subject to any disclaimer, the term of this patent is extended or adjusted under 35 U.S.C. 154(b) by 0 days.

(21) Appl. No.: 15/172,844

(22) Filed: Jun. 3, 2016

(65) Prior Publication Data

US 2016/0355434 A1 Dec. 8, 2016

(30) Foreign Application Priority Data

Jun. 4, 2015 (JP) ................ 2015-113954

(51) Int. Cl.
| | |
|---|---|
| C03C 21/00 | (2006.01) |
| C03C 10/02 | (2006.01) |
| C03C 10/06 | (2006.01) |
| C03C 10/08 | (2006.01) |
| C03C 10/00 | (2006.01) |
| C03C 3/085 | (2006.01) |
| C03C 3/087 | (2006.01) |
| C03C 3/095 | (2006.01) |
| C03C 3/097 | (2006.01) |
| B32B 17/06 | (2006.01) |

(52) U.S. Cl.
CPC .......... *C03C 10/0045* (2013.01); *B32B 17/06* (2013.01); *C03C 3/085* (2013.01); *C03C 3/087* (2013.01); *C03C 3/095* (2013.01); *C03C 3/097* (2013.01); *C03C 10/0018* (2013.01); *C03C 10/0036* (2013.01); *C03C 21/002* (2013.01); *B32B 2307/412* (2013.01); *B32B 2307/416* (2013.01); *C03C 2204/00* (2013.01)

(58) Field of Classification Search
None
See application file for complete search history.

(56) References Cited

U.S. PATENT DOCUMENTS

| | | | |
|---|---|---|---|
| 5,066,524 A | 11/1991 | Baba et al. | |
| 9,236,075 B2 | 1/2016 | Momono et al. | |
| 2011/0135964 A1* | 6/2011 | Yagi | C03C 3/095 428/846.9 |
| 2012/0114955 A1* | 5/2012 | Almoric | C03C 3/085 428/426 |
| 2014/0087194 A1* | 3/2014 | Dejneka | C03C 3/091 428/410 |
| 2014/0134397 A1* | 5/2014 | Amin | C03C 3/093 428/141 |
| 2014/0141285 A1* | 5/2014 | Momono | C03C 1/00 428/846.9 |
| 2015/0064474 A1* | 3/2015 | Dejneka | C03B 32/02 428/410 |

FOREIGN PATENT DOCUMENTS

| | | |
|---|---|---|
| EP | 2263979 A1 | 12/2010 |
| JP | 04338131 A | 11/1992 |
| JP | 06009245 A | 1/1994 |
| JP | 09263424 A | 10/1997 |
| JP | 2013023420 A | 2/2013 |
| JP | 2014114200 A | 6/2014 |

OTHER PUBLICATIONS

Extended European Search Report for European Patent Application No. 16172249.1; dated Oct. 27, 2016.

* cited by examiner

*Primary Examiner* — David R Sample
(74) *Attorney, Agent, or Firm* — Cantor Colburn LLP

(57) ABSTRACT

Provided is a high-strength crystallized glass or substrate having a high visible light transmittance and a good color balance, which is suitable for use in protecting members of portable electronic devices, optical devices and the like. Provided is a crystallized glass comprising, in terms of mol % on an oxide basis: an $SiO_2$ component of 30.0% or more and 70.0% or less, an $Al_2O_3$ component of 8.0% or more and 25.0%, an $Na_2O$ component of 0% or more and 25.0% or less, an MgO component of 0% or more and 25.0% or less, a ZnO component of 0% or more and 30.0% or less and a $TiO_2$ component of 0% or more and 10.0% or less, the molar ratio $[Al_2O_3/(MgO+ZnO)]$ having a value of 0.5 or more and 2.0 or less, and comprising one or more selected from $RAl_2O_4$, $RTi_2O_5$, $R_2TiO_4$, $R_2SiO_4$, $RAl_2Si_2O_8$ and $R_2Al_4Si_5O_{18}$ as a crystal phase.

14 Claims, No Drawings

CRYSTALLIZED GLASS AND CRYSTALLIZED GLASS SUBSTRATE

CROSS REFERENCE TO RELATED APPLICATIONS

This application is based on and claims the benefit of priority from Japanese Patent Application No. 2015-113954, filed on Jun. 4, 2015, the content of which is incorporated herein by reference.

BACKGROUND OF THE INVENTION

Field of the Invention

The present invention relates to a crystallized glass and a substrate comprising the crystallized glass as a base material. Specifically, the present invention relates to a high-strength crystallized glass and substrate having an excellent visible light transmittance and color balance, which is suitable for protecting members of portable electronic devices, optical devices and the like.

Related Art

Cover glasses for protecting displays are used in portable electronic devices such as smart phones and tablet PCs. Further, protectors for protecting lenses are also used in vehicle-mounted optical devices. Materials for these cover glasses and protectors are required to have a high visible light transmittance and a good color balance as well as a high strength. Accordingly, in recent years, there have been increasing demands for materials having a higher strength in the use of cover glasses and protectors so that the aforementioned devices can be durable under more harsh conditions.

Traditionally, a chemically strengthened glass is used as a material for the aforementioned protecting members. However, the conventional chemically strengthened glass has a very small resistance against a crack occurring perpendicular to a surface of the glass. Therefore, breakage problems often happen when portable devices are accidentally dropped.

Further, sapphire has gathered attention as a transparent material having a higher hardness than glass, but the manufacturing productivity and processability of sapphire is poorer as compared with glass.

In addition to the aforementioned materials, another possibility is a crystallized glass in which crystals are precipitated inside a glass to enhance the strength of the glass. The conventional crystallized glass can possess higher mechanical properties than the amorphous glass while having a poor visible light transmission and color balance. Therefore, the conventional crystallized glass has been unsuitable for use in the aforementioned protecting members. Further, the conventional crystallized glass has a poor productivity because a glass material thereof may be very viscous and susceptible to devitrification. Therefore, use of the conventional crystallized glass for the aforementioned protecting members is challenging.

Patent Document 1 discloses a crystallized glass substrate for information recording media. The above crystallized glass substrate has a poor visible light transmittance and color balance. Further, a sufficient compressive stress value cannot be obtained, and a stress layer cannot be deeply formed when chemical strengthening is performed.

Patent Document 1: Japanese Unexamined Patent Application, Publication No. 2014-114200

SUMMARY OF THE INVENTION

The present invention is made in view of the above problems. An objective of the present invention is to provide a high-strength crystallized glass or substrate having a high visible light transmittance and a good color balance, which is suitable for use in protecting members of portable electronic devices, optical devices and the like.

Further, another objective of the present invention is to provide the above crystallized glass or substrate at a low cost. Accordingly, yet another objective of the present invention is to provide a crystallized glass comprising a base glass having a low viscosity and a higher devitrification resistance.

After conducting extensive studies to solve the above problems, the present inventor finds that the above problems can be solved when specific values of the contents and content ratios of specific components of a crystallized glass are used to allow precipitation of a specific crystal phase. Then the present invention has been completed. Specifically, the present invention provides the following.

(Constitution 1)

A crystallized glass comprising, in terms of mol % on an oxide basis:

an $SiO_2$ component of 30.0% or more and 70.0% or less,
an $Al_2O_3$ component of 8.0% or more and 25.0% or less,
an $Na_2O$ component of 0% or more and 25.0% or less,
an $MgO$ component of 0% or more and 25.0% or less,
an $ZnO$ component of 0% or more and 30.0% or less, and
a $TiO_2$ component of 0% or more and 10.0% or less,
the molar ratio $[Al_2O_3/(MgO+ZnO)]$ having a value of 0.5 or more and 2.0 or less, and
comprising one or more selected from $RAl_2O_4$, $RTi_2O_5$, $R_2TiO_4$, $R_2SiO_4$, $RAl_2Si_2O_8$ and $R_2Al_4Si_5O_{18}$ as a crystal phase, provided that R is one or more selected from Zn, Mg and Fe.

(Constitution 2)

The crystallized glass according to the constitution 1, wherein the molar ratio $[TiO_2/Na_2O]$ of the $TiO_2$ component to the $Na_2O$ component in terms of mol % on an oxide basis has a value of 0 or more and 0.41 or less.

(Constitution 3)

The crystallized glass according to the constitution 1 or 2, wherein the molar ratio $[MgO/Na_2O]$ of the MgO component to the $Na_2O$ component in terms of mol % on an oxide basis has a value of 0 or more and 1.60 or less.

(Constitution 4)

The crystallized glass according to any one of the constitutions 1 to 3, wherein a light transmittance across a thickness of 1 mm at a wavelength of 500 nm including reflection loss is more than 50%.

(Constitution 5)

The crystallized glass according to any one of the constitutions 1 to 4, wherein the difference in light transmittance across a thickness of 1 mm including reflection loss at a wavelength of 700 nm and at a wavelength of 500 nm is within 2.0%, and the difference in light transmittance across a thickness of 1 mm including reflection loss at a wavelength of 700 nm and at a wavelength of 410 nm is within 6.0%.

(Constitution 6)

The crystallized glass according to any one of the constitutions 1 to 5, wherein the total value of the content of the MgO component and the content of the ZnO component is 1.0% or more and 30.0% or less in terms of mol % on an oxide basis.

(Constitution 7)

The crystallized glass according to any one of the constitutions 1 to 6, comprising, in terms of mol % on an oxide basis:

a $B_2O_3$ component of 0% or more and 25.0% or less,
a $P_2O_5$ component of 0% or more and 10.0% or less, a K2O component of 0% or more and 20.0% or less,
a CaO component of 0% or more and 10.0% or less,
a BaO component of 0% or more and 10.0% or less,
an FeO component of 0% or more and 8% or less,
a ZrO2 component of 0% or more and 10.0% or less, and
an SnO2 component of 0% or more and 5.0% or less.
(Constitution 8)

The crystallized glass according to any one of the constitutions 1 to 7, comprising, in terms of mol % on an oxide basis:
an Li2O component of 0% or more and 10.0% or less,
an SrO component of 0% or more and 10.0% or less,
an La2O3 component of 0% or more and 3% or less,
a Y2O3 component of 0% or more and 3% or less,
an Nb2O5 component of 0% or more and 5% or less,
a Ta2O5 component of 0% or more and 5% or less, and
a WO3 component of 0% or more and 5% or less.
(Constitution 9)

A crystallized glass substrate comprising the crystallized glass according to any one of the constitutions 1 to 8 as a base material, and having a compressive stress layer in a surface thereof, wherein the compressive stress layer has a compressive stress value of 300 MPa or more.
(Constitution 10)

The crystallized glass substrate according to the constitution 9, wherein the compressive stress layer has a thickness of 1 μm or more.

The present invention can provide a high-strength crystallized glass or substrate having a high visible light transmission and a good color balance, which is suitable for use in protecting members of portable electronic devices, optical devices and the like. In the crystallized glass according to the present invention, the light transmittance across a thickness of 1 mm at a wavelength of 500 nm including reflection loss is more than 50%. In a more preferred embodiment, it is more than 70%. In a still more preferred embodiment, it is more than 80%.

In the crystallized glass according to the present invention, the difference ΔT1 in a light transmittance across a thickness of 1 mm including reflection loss at a wavelength of 700 nm and at a wavelength of 500 nm is within 2.0%, and the difference ΔT2 in a light transmittance across a thickness of 1 mm including reflection loss at a wavelength of 700 nm and at a wavelength of 410 nm is within 6.0%. In a more preferred embodiment, ΔT1 is within 1.5%, and ΔT2 is within 5.0%. In a still more preferred embodiment, ΔT1 is within 1.2%, and ΔT2 is within 2.5%.

Further, in the crystallized glass according to the present invention, the Vickers hardness [Hv] is 600 or more. In a more preferred embodiment, it is 650 or more. In a still more preferred embodiment, it is 700 or more. In the most preferred embodiment, it is 730 or more.

The crystallized glass according to the present invention can also be used as a material for optical lenses because it has a high visible light transmittance. Further, the crystallized glass according to the present invention can also be used as outer frame members of portable electronic devices and other decorative uses by taking advantage of the characteristic appearance of a glass-based material.

DETAILED DESCRIPTION OF THE INVENTION

Below, embodiments of the crystallized glass according to the present invention will be described in detail, but the present invention shall not be limited to the following embodiments in any sense. Modifications may be made appropriately without departing from the scope of the present invention. Note that descriptions may be omitted for items already described elsewhere in the specification. This shall not affect the spirit of the present invention.

The term "crystallized glass," which is also called "glass ceramics," refers to a material in which crystals are precipitated inside a glass material by heat-treating the glass material. The crystallized glass according to the present invention is a material having a crystal phase and a glass phase, and can be distinguished from an amorphous solid. Physical property values which cannot be obtained for a glass can be obtained for a crystallized glass by virtue of crystals dispersed inside. Characteristic values which cannot be achieved for a glass can be obtained for a crystallized glass with regard to, for example, mechanical strength such as Young's modulus and fracture toughness; etchability with acidic and alkaline chemical liquids; thermal properties such as the thermal expansion coefficient; an increase in the glass transition temperature and the disappearance of the glass transition temperature (enhanced thermal resistance).

The crystal phase of a crystallized glass can be identified by peak angles observed in an X-ray diffraction pattern from X-ray diffraction analysis, and if needed, by TEMEDX.

The crystallized glass according to the present invention comprises one or more selected from RAl2O4, RTi2O5, R2TiO4, R2SiO4, RAl2Si2O8 and R2Al4Si5O18 as a crystal phase, provided that R is one or more selected from Zn, Mg and Fe.

The crystallized glass comprising these as a crystal phase can possess a high mechanical strength even in a case where the sizes of precipitated crystals are very minute. Therefore, the above crystallized glass comprising these as a crystal phase tends to have a high light transmittance and a good color balance while maintaining a high mechanical strength required for use in protecting members of portable electronic devices, optical devices and the like.

[Components of Crystallized Glass]

The composition range of each component in the crystallized glass according to the present invention will be described below. Throughout the present specification, the content of each component is expressed in terms of mol % on an oxide content basis relative to the total mass of a glass material, unless otherwise stated. Here, the phrase "on an oxide content basis" means that assuming that oxides, complex salts, metal fluorides and the like used as raw materials for constitutive components of the crystallized glass according to the present invention are all decomposed into their oxides upon melting, the content of a constitutive component in the crystallized glass according to the present invention is expressed relative to the total mass of the above oxides as 100 mol %.

Further, the term "glass" alone as used herein may include a glass material before crystallization.

The SiO2 component is essential for forming a glass network structure in the crystallized glass according to the present invention. In a case where the amount of this component is less than 30%, the chemical durability of the resulting glass will be poor, and the devitrification resistance will be deteriorated. Therefore, the content of the SiO2 component is preferably at least 30.0%, more preferably at least 40.0%, and most preferably at least 50.0%.

On the other hand, in a case where the content of the SiO2 component is 70.0% or less, an excessively increased viscosity and a deteriorated meltability can be prevented. Therefore, the content of SiO2 component is preferably at most 70.0%, more preferably at most 68.0%, still more preferably at most 66.5%, and most preferably at most 65.0%.

The Al2O3 component is essential for forming a glass network structure as in SiO2, and also essential as a component which can constitute a crystal phase by heat-treating of a glass material. It is an important component which can contribute to improvement of the stability and chemical durability of a glass material, but in a case where the amount is less than 8.0%, the aforementioned effects will be insignificant. Therefore, the content of the Al2O3 component is preferably at least 8.0%, more preferably at least 10.0%, and most preferably at least 12.0%.

On the other hand, in a case where the content of the Al2O3 component is more than 25.0%, the meltability and the devitrification resistance will be deteriorated. Therefore, the content of the Al2O3 component is preferably at most 25.0%, more preferably at most 20.0%, still more preferably at most 17.0%, and most preferably at most 15.0%.

The Na2O component is an optional component for improving the low-temperature meltability and the shapability.

Meanwhile, in a case where the content of the Na2O component is 25.0% or less, deteriorated chemical durability and increased mean linear expansion coefficient due to the Na2O component excessively contained can be minimized. Therefore, the content of the Na2O component is preferably at most 25.0%, more preferably at most 20.0%, and most preferably at most 15.0%.

In a case where chemical strengthening by ion exchange is performed, a compressive stress layer can effectively be formed by including the Na2O component in a crystallized glass, and replacing Na+ ions in the crystallized glass with K+ ions. Therefore, in a case where chemical strengthening by ion exchange is performed, the content of the Na2O component may be preferably more than 0%, and may be more preferably at least 2.0%, still more preferably at least 4.0%, and most preferably at least 6.0%.

The MgO component is one of the components which can constitute a crystal phase, and is an optional component. In a case where the content of the MgO component is more than 0%, an effect of improving the low-temperature meltability can be obtained. Therefore, the content of the MgO component may be preferably more than 0%, and may be more preferably at least 3.0%, still more preferably at least 5.0%.

On the other hand, in a case where the content of the MgO component is 25% or less, decreased devitrification resistance due to the MgO component excessively contained can be minimized. Therefore, the content of the MgO component is preferably at most 25.0%, more preferably at most 20.0%, and most preferably at most 15.0%.

The ZnO component is one of the components which can constitute a crystal phase, and is an optional component. In a case where the content of the ZnO component is more than 0%, an effect of improving the low-temperature meltability and an effect of improving the chemical durability can be obtained. Therefore, the content of the ZnO component may be preferably more than 0%, and may be more preferably at least 3.0%, still more preferably at least 6.0%, and most preferably at least 8.0%.

On the other hand, in a case where the content of the ZnO component is 30% or less, the deterioration of devitrification resistance can be minimized. Therefore, the content of the ZnO component is preferably at most 30.0%, more preferably at most 20.0%, still more preferably at most 15.0%, and most preferably at most 10.0%.

The TiO2 component is an optional component which can serve to form nuclei for promoting precipitation of crystals, and also contribute to decreasing the viscosity of a crystallized glass and improving the chemical durability. The content of the TiO2 component may be preferably more than 0%, and may be more preferably at least 0.5%, still more preferably at least 1.0%, and most preferably at least 1.5%.

On the other hand, in a case where the content of the TiO2 component is 10.0% or less, an increase in devitrification can be minimized. Therefore, the content of the TiO2 component is preferably at most 10.0%, more preferably at most 7.0%, still more preferably at most 4.0%, and most preferably at most 3.0%.

In the present invention, the molar ratio of the content of the Al2O3 component to the total content of MgO and ZnO in terms of mol % on an oxide basis, i.e., [Al2O3/(MgO+ZnO)] needs to have a value in a range of 0.5 or more and 2.0 or less in order to obtain a desired crystal phase. In order to readily obtain the aforementioned effects, the lower limit of the value of [Al2O3/(MgO+ZnO)] is preferably 0.6, more preferably 0.7, and most preferably 0.8. Similarly, the upper limit of the value of [Al2O3/(MgO+ZnO)] is preferably 1.8, more preferably 1.5, and most preferably 1.2.

In the present invention, in order to obtain a desired visible light transmittance and color balance, the molar ratio of the TiO2 component to the Na2O component in terms of mol % on an oxide basis, i.e., the value of [TiO2/Na2O] is preferably in the range of 0 or more and 0.41 or less. In order to more readily obtain the aforementioned effects, the lower limit of the value of [TiO2/Na2O] is preferably 0.05, more preferably 0.10, and most preferably 0.12. Similarly, the upper limit of the value of [TiO2/Na2O] is preferably 0.41, more preferably 0.35, still more preferably 0.25, and most preferably 0.15.

In the present invention, the molar ratio of the MgO component to the Na2O component in terms of mol % on an oxide basis, i.e., the value of [MgO/Na2O] is preferably in the range of 0 or more and 1.60 or less in order to obtain a desired crystallized glass having less significant staining and excellent color balance while having excellent devitrification resistance on melting, meltability and shapability.

In order to more readily obtain the aforementioned effects, the lower limit of the value of [MgO/Na2O] is preferably 0.10, more preferably 0.30, and most preferably 0.50. Similarly, the upper limit of the value of [MgO/Na2O] is preferably 1.60, more preferably 1.10, still more preferably 0.80, and most preferably 0.60.

In the present invention, the total content of the MgO component and the ZnO component in terms of mol % on an oxide basis, i.e., the value of [MgO+ZnO] is preferably in the range of 1.0% or more and 30.0% or less in order to obtain a desired crystal phase while maintaining excellent meltability and shapability. In order to more readily obtain the aforementioned effects, the lower limit of the value of [MgO+ZnO] is preferably 5.0%, more preferably 10.0%, and most preferably 12.0%. Similarly, the upper limit of the value of [MgO+ZnO] is preferably 30.0%, more preferably 20.0%, still more preferably 18.0%, and most preferably 16.0%.

In the present invention, the molar ratio of the ZnO component to the MgO component in terms of mol % on an oxide basis, i.e., the value of [ZnO/MgO] is preferably in the range of 0 or more and 5 or less in order to obtain an excellent crystallized glass having a high light transmittance and a good color balance in which very minute crystals are precipitated.

In order to more readily obtain the aforementioned effects, the lower limit of the value of [ZnO/MgO] is more preferably 0.44, and most preferably 0.45. Similarly, the upper limit of the value of [ZnO/MgO] is more preferably 4.8, and most preferably 4.7.

The $B_2O_3$ component may be added as an optional component because it can contribute to decreasing the viscosity of a glass, and can improve meltability and shapability of a glass when contained in an amount of more than 0%.

On the other hand, in a case where the $B_2O_3$ component is contained in excess, the chemical durability of a crystallized glass tends to be decreased, and the formation of desired crystals tends to be prevented. Therefore, the content of the $B_2O_3$ component is preferably at most 25.0%, more preferably at most 10.0%, still more preferably at most 5.0%, and most preferably at most less than 2.0%.

The $P_2O_5$ component is an optional component which can contribute to improving the low-temperature meltability of a glass when contained in an amount of more than 0%.

On the other hand, in a case where the $P_2O_5$ component is contained in excess, the devitrification resistance tends to be decreased, and the phase separation of a glass tends to occur. Therefore, the content of the $P_2O_5$ component is preferably at most 10.0%, more preferably at most 5.0%, and most preferably at most 1.0%.

The $K_2O$ component is an optional component which can contribute to improving the low-temperature meltability and shapability of a glass.

On the other hand, in a case where the $K_2O$ component is contained in excess, the chemical durability tends to be deteriorated, and the mean linear expansion coefficient tends to be increased. Therefore, the content of the $K_2O$ component is preferably at most 20.0%, more preferably at most 10.0%, and most preferably at most 5.0%.

In a case where chemical strengthening by ion exchange is performed, inclusion of the $K_2O$ component in a crystallized glass can be effective for deeply forming a compressive stress layer. Therefore, in a case where chemical strengthening by ion exchange is performed, the content of the $K_2O$ component may be preferably more than 0%, and may be more preferably at least 0.5%, still more preferably at least 0.8%, and most preferably at least 1.0%.

The CaO component is an optional component which can contribute to improving the low-temperature meltability of a glass when contained in an amount of more than 0%.

On the other hand, in a case where the CaO component is contained in excess, the devitrification resistance tends to be decreased. Therefore, the content of the CaO component is preferably at most 10.0%, more preferably at most 5.0%, still more preferably at most 3.0%, and most preferably at most 1.0%

The BaO component is an optional component which can contribute to improving the low-temperature meltability of a glass when contained in an amount of more than 0%.

On the other hand, in a case where the BaO component is contained in excess, the devitrification resistance tends to be decreased. Therefore, the content of the BaO component is preferably at most 10.0%, more preferably at most 5.0%, still more preferably at most 3.0%, and most preferably at most 1.0%

The FeO component may optionally be included because it is one of the components which can constitute a crystal phase, and may also act as a clarifier.

On the other hand, in a case where the FeO component is contained in excess, excessive staining tends to occur, and platinum used in a glass melting device tends to undergo alloy formation. Therefore, the content of the FeO component is preferably at most 8.0%, more preferably at most 4.0%, and most preferably at most 1.0%.

The $ZrO_2$ component is an optional component which can serve to form nuclei to promote precipitation of crystals, and also contribute to improving the chemical durability. Therefore, the content of the $ZrO_2$ component may be preferably more than 0%, and may be more preferably at least 0.4%, still more preferably at least 0.8%, and most preferably at least 1.0%.

On the other hand, in a case where the $ZrO_2$ component is contained is excess, the devitrification resistance of a glass tends to be decreased. Therefore, the content of the $ZrO_2$ component is preferably at most 10.0%, more preferably at most 4.0%, still more preferably at most 2.0%, and most preferably at most 1.5%.

The $SnO_2$ component is an optional component which can serve as a clarifier, and also can serve to form nuclei to promote precipitation of crystals. Therefore, the content of the $SnO_2$ component may be preferably more than 0%, and may be more preferably at least 0.01%, and most preferably at least 0.05%.

On the other hand, in a case where the $SnO_2$ component is contained in excess, the devitrification resistance of a glass tends to be decreased. Therefore, the content of the $SnO_2$ component is preferably at most 5.0%, more preferably at most 1.0%, still more preferably at most 0.4%, and most preferably at most 0.2%.

The $Li_2O$ component is an optional component which can improve the low-temperature meltability and shapability of a glass.

On the other hand, in a case where the $Li_2O$ component is contained in excess, the chemical durability tends to be deteriorated, and the mean linear expansion coefficient tends to be increased. Therefore, the content of the $Li_2O$ component is preferably at most 10.0%, more preferably at most 5.0%, and most preferably at most 2.0%.

In a case where chemical strengthening by ion exchange is performed, inclusion of the $Li_2O$ component in a crystallized glass can be effective for deeply forming a compressive stress layer. Therefore, in a case where chemical strengthening by ion exchange is performed, the content of the $Li_2O$ component may be preferably more than 0%, and may be more preferably at least 0.5%, still more preferably at least 0.8%, and most preferably at least 1.0%.

The SrO component is an optional component which can improve the low-temperature meltability of a glass when contained in an amount of more than 0%.

On the other hand, in a case where the SrO component is contained in excess, the devitrification resistance tends to be decreased. Therefore, the content of the SrO component is preferably at most 10.0%, still more preferably at most 5.0%, and most preferably at most 1.0%.

The $La_2O_3$ component is an optional component which can improve the mechanical strength of a crystallized glass when contained in an amount of more than 0%.

On the other hand, in a case where the $La_2O_3$ component is contained in excess, the devitrification resistance tends to be decreased. Therefore, the content of the $La_2O_3$ component is preferably at most 3.0%, more preferably at most 2.0%, and most preferably at most 1.0%.

The $Y_2O_3$ component is an optional component which can improve the mechanical strength of a crystallized glass when contained in an amount of more than 0%.

On the other hand, in a case where the $Y_2O_3$ component is contained in excess, the devitrification resistance tends to be decreased. Therefore, the content of the $Y_2O_3$ component is preferably at most 3.0%, more preferably at most 2.0%, and most preferably at most 1.0%.

The $Nb_2O_5$ component is an optional component which can improve the mechanical strength of a crystallized glass when contained in an amount of more than 0%.

On the other hand, in a case where the $Nb_2O_5$ component is contained in excess, the devitrification resistance tends to be decreased. Therefore, the content of the $Nb_2O_5$ component is preferably at most 5.0%, more preferably at most 2.0%, and most preferably at most 1.0%.

The $Ta_2O_5$ component is an optional component which can improve the mechanical strength of a crystallized glass when contained in an amount of more than 0%.

On the other hand, in a case where the $Ta_2O_5$ component is contained in excess, the devitrification resistance tends to be decreased. Therefore, the content of the $Ta_2O_5$ component is preferably at most 5.0%, more preferably at most 2.0%, and most preferably at most 1.0%.

The $WO_3$ component is an optional component which can increase the mechanical strength of a crystallized glass when contained in an amount of more than 0%.

On the other hand, in a case where the $WO_3$ component is contained in excess, the devitrification resistance tends to be decreased. Therefore, the content of the $WO_3$ component is preferably at most 5.0%, more preferably at most 2.0%, and most preferably at most at most 1.0%.

The crystallized glass according to the present invention may comprise an $As_2O_3$ component, an $Sb_2O_3$ component and a $CeO_2$ component, and one or more selected from the group of F, Cl, NOx and SOx as a clarifier. If contained, the content of a clarifier is preferably at most 5.0%, more preferably at most 2.0%, and most preferably at most 1.0%.

Other components which are not described above can be added, if needed, to the crystallized glass according to the present invention in a range where the properties of the crystallized glass according to present invention are not impaired. However, except for Ti, Fe, Zr, Nb, W, La, Gd, Y, Yb and Lu, transition metal components such as V, Cr, Mn, Co, Ni, Cu, Ag and Mo are preferably not substantially contained because they have a characteristic to stain a glass, resulting in absorption of a specific wavelength in the visible range if they are each contained, alone or in combination, even in a small amount.

Further, in recent years, components of Pb, Th, Cd, Tl, Os, Be and Se are each recognized as harmful chemicals, and tend to be used less. Therefore, environmental measures are required not only for glass manufacturing steps but also for processing steps, and in addition, even for disposal after production. Therefore, these substances are preferably not substantially contained when environmental issues are major concerns.

The crystallized glass according to the present invention may consist of the aforementioned components only as a glass composition, but other components may be added in a range where properties of glass are not significantly impaired. For example, a $TeO_2$ component, a $Bi_2O_3$ component and the like may be added.

[Physical Properties of Crystallized Glass]

The crystallized glass according to the present invention preferably has the following properties.

The crystallized glass according to the present invention preferably has a high devitrification resistance, more specifically preferably has a low liquidus temperature. That is, the liquidus temperature of the glass according to the present invention is preferably at most 1420° C., more preferably at most 1380° C., still more preferably at most 1340° C., and most preferably at most 1300° C. This can reduce devitrification when forming a glass from a molten state even if a molten glass is allowed to flow at a lower temperature, which, in turn, can reduce adverse effects on a crystallized glass substrate and optical properties. Further, a glass can be shaped even when the glass is melted at a lower temperature. Therefore, deterioration of platinum devices and molding dies can be prevented, and energy consumption when shaping a glass can also be reduced, which, in turn, can reduce the cost of manufacturing a glass.

Meanwhile, there is no particular limitation for the lower limit of the liquidus temperature of the glass according to the present invention, but the liquidus temperature of the glass obtained according to the present invention may be preferably at least 1000° C., more preferably at least 1100° C., and still more preferably at least 1200° C.

Here, the liquidus temperature is an indicator of devitrification resistance, and as used herein defined as a value measured in accordance with the following method. First, 30 cc of a cullet glass sample is introduced into a 50 mL capacity platinum crucible, and maintained at 1500° C. to obtain a completely molten state. Next, the glass was cooled to a predetermined temperature and held for 12 hours, and then removed from the furnace for further cooling. Subsequently, the glass was observed for the presence or absence of crystals in the surface and inside of the glass. The above predetermined temperature was varied down to 1200° C. with 10° C. temperature steps, and the aforementioned observation was repeated for each time. Then the lowest temperature at which crystals are not observed among the above predetermined temperatures is taken as the liquidus temperature.

For the crystallized glass according to the present invention, the viscosity of a glass melt at the liquidus temperature is 10 dPa·s or more. Having such a viscosity, the development of striae can be prevented, and a thin plate can be shaped from a molten glass, or can be formed by the direct press method. Therefore, for the glass according to the present invention, the viscosity of a glass melt at the liquidus temperature is preferably 10 dPa·s or more, more preferably 100 dPa·s or more, more preferably 350 dPa·s or more, and most preferably 500 dPa·s or more.

For the crystallized glass according to the present invention, the viscosity of a glass melt at 1400° C. is preferably 1000 dPa·s or less. Having such a viscosity, worsened defoamability, deterioration of glass manufacturing facility due to excessively high temperature during clarification, contamination of impurities and reduced staining of a glass melt can be prevented. Therefore, for the glass according to the present invention, the viscosity of a glass melt at 1400° C. is preferably 1000 dPa·s or less, more preferably 800 dPa·s or less, still more preferably 650 dPa·s or less, and most preferably 500 dPa·s or less.

For the crystallized glass according to the present invention, the Vickers hardness [Hv] is preferably 600 or more. Having such a hardness, occurrence of flaws can be prevented, and the mechanical strength can be enhanced. Therefore, for the crystallized glass according to the present invention, the Vickers hardness [Hv] is preferably 600 or more, more preferably 650 or more, still more preferably 700 or more, and most preferably 730 or more.

For the crystallized glass substrate according to the present invention, a compressive stress layer can be formed by performing ion exchange treatment for chemical strengthening. In a case where a compressive stress layer is formed, the compressive stress value of the compressive stress layer is preferably 300 MPa or more. Having such a compressive stress value, extension of a crack can be prevented, and the mechanical strength can be enhanced. Therefore, in a case where chemical strengthening is performed for the crystallized glass substrate according to the present invention, the compressive stress value of a compressive stress layer is preferably 300 MPa or more, still more preferably 600 MPa or more, and most preferably 800 MPa or more.

A compressive stress layer in the crystallized glass substrate according to the present invention preferably has a thickness of 1 µm or more. Having a compressive stress layer with such a thickness, even if a deep crack occurs in a crystallized glass substrate, extension of the crack or breakage of the substrate can be prevented. Therefore, the thickness of a compressive stress layer is preferably 1 µm or more, more preferably 5 µm or more, and most preferably 8 µm or more.

The crystallized glass substrate according to the present invention preferably does not break even when a 130 g steel ball is dropped to the substrate from a height of 100 cm. Having such an impact resistance, the substrate can tolerate the impact upon drop or collision when used as a protecting member. Therefore, a drop height from which a 130 g steel ball is dropped but does not break a substrate is preferably 100 cm, more preferably 150 cm, and most preferably 180 cm.

[Method of Production]

The crystallized glass according to the present invention can be produced, for example, as follows. That is, raw materials are uniformly mixed so that the content of each component described above falls within a predetermined range. The resulting mixture is introduced into a platinum crucible or a quartz crucible, and melted and stirred to uniformity at a temperature in a range of 1300 to 1540° C. for 5 to 24 hours in an electric furnace or a gas furnace depending on the meltability of the glass composition, and then cooled to an appropriate temperature, and then casted into a mold and annealed.

[Shaping of Glass Material]

The glass material for the crystallized glass according to the present invention can be melt-shaped by a known method. Note that there is no particular limitation for the means for shaping a glass melt.

[Crystallization of Glass Material]

A glass material for the crystallized glass according to the present invention is heat-treated after shaping or shaping and processing to allow crystals to uniformly precipitate inside the glass. This heat treatment may be performed in one step, but more preferably performed in two temperature steps. That is, first, a nucleus formation step is performed by heat treatment at a first temperature, and then a crystal growth step is performed after the nucleus formation step by heat treatment at a second temperature higher than that of the nucleus formation step. The heat treatment at the first temperature is referred to the first heat treatment, and the heat treatment at the second temperature is referred to the second heat treatment.

The nucleus formation step and the crystal growth step may be performed sequentially by performing heat treatment at one temperature step. That is, temperature may be increased to a predetermined heat treatment temperature, and then that temperature may be maintained for a certain time after reaching that heat treatment temperature, and then may be cooled.

Preferred heat treatment conditions are as follows to obtain desired physical properties for a crystallized glass.

The first temperature is preferably 600° C. to 750° C. The first heat treatment may be omitted. The second temperature is preferably 650° C. to 850° C.

The holding time at the first temperature is preferably 0 minute to 2000 minutes, and most preferably 180 minutes to 1440 minutes.

The holding time at the second temperature is preferably 0 minute to 600 minutes, and most preferably 60 minutes to 300 minutes.

In a case where heat treatment is performed in one temperature step, the temperature in the heat treatment is preferably in the range of 600° C. or more and 800° C. or less, and more preferably in the range of 630° C. or more and 770° C. or less in order to allow a desired crystal phase to precipitate. Further, the holding time at a heat treatment temperature is preferably 0 minute to 500 minutes, and more preferably 60 minutes to 300 minutes in order to allow a desired crystal phase to precipitate.

Note that a holding time of 0 minute means that heating or cooling is started in less than 1 minute after the target temperature is reached.

For the glass or crystallized glass according to the present invention, a shaped glass body can be produced, for example, by means of grinding, polish processing and the like. That is, the glass or crystallized glass is subjected to machine processing such as grinding and polishing to produce a shaped glass body. A crystallized glass substrate comprising the crystallized glass as a base material according to the present invention can be produced by processing a shaped glass body into a thin plate-like shape. Note that the method to producing a shaped glass body is not limited to the above methods.

In the crystallized glass substrate according to the present invention, a compressive stress layer may be formed in order to further enhance the mechanical strength. The crystallized glass according to the present invention already has enhanced mechanical properties by virtue of precipitated crystals. Further, an additionally enhanced strength can be obtained by forming a compressive stress layer.

As a method of forming a compressive stress layer, for example, the chemical strengthening method may be used in which alkaline components present in a surface layer of a crystallized glass substrate are subjected to exchange reactions with alkaline components having a larger ionic radius than the components present in the surface layer, thereby forming a compressive stress layer in the surface layer. Further, the heat strengthening method in which a crystallized glass substrate is heated and then quenched, and the ion implantation method in which ions are injected into a surface layer of a crystallized glass substrate may also be used.

The chemical strengthening method can be performed via the following steps. A crystallized glass substrate is allowed to make contact with or immersed in a fused salt for 0.1 to 12 hours, the fused salt being obtained by heating salts containing potassium or sodium, for example, potassium nitrate, ($KNO_3$), sodium nitrate ($NaNO_3$) or complex salts thereof at 350 to 500° C. This can promote ion exchange reactions of a lithium component ($Li^+$ ion) or a sodium component ($Na^+$ ion) present in the glass phase near a surface, with a sodium component ($Na^+$ ion) or a potassium component ($K^+$ ion) as an alkaline component having a larger ionic radius than the lithium component ($Li^+$ ion) or the sodium component ($Na^+$ ion) present in the glass phase near the surface. As a result, a compressive stress layer is formed in a surface portion of the substrate.

A compressive stress layer having a compressive stress value of 300 MPa or more and having a thickness of 1 µm or more can be formed in the crystallized glass according to the present invention by ion exchange according to the chemical strengthening method. According to a more preferred embodiment, a compressive stress layer having a compressive stress value of 600 MPa or more can be formed. According to the most preferred embodiment, a compressive stress layer having a compressive stress value of 800 MPa or more can be formed. Further, according to a more preferred embodiment, a compressive stress layer having a thickness of 5 µm or more can be formed. According to the most preferred embodiment, a compressive stress layer having a thickness of 8 µm or more can be formed.

There is no particular limitation for the heat strengthening method, but it can be performed as follows: for example, a crystallized glass substrate is heated at 300° C. to 600° C., and then rapid cooling such as water cooling and/or air cooling is performed to form a compressive stress layer by taking advantage of the difference in temperature between the surface and the interior of the glass substrate. Note that a compressive stress layer can also be formed more effectively when combined with the aforementioned chemical treatment method.

EXAMPLES

The crystallized glasses and substrates from Examples according to the present invention are described in the tables. The crystallized glasses from Examples according to the present invention were manufactured as follows. First, corresponding raw materials such as oxides, hydroxides, carbonates, nitrates, fluorides, chlorides, hydroxides and metaphosphate compounds were each selected as a raw material of each component, and weighed and uniformly mixed to give a composition ratio for each Example shown in the tables. Next, mixed raw materials were introduced into a platinum crucible, and melted in an electric furnace for 5 to 24 hours at a temperature of 1300 to 1550° C. depending on the meltability of the glass composition. Subsequently, the molten glass was stirred to uniformity, and then casted into a mold and the like and annealed to produce a glass material.

The resulting glass material was subjected to one-step or two-step heat treatment for nucleus formation and crystallization to produce a crystallized glass. One-step heat treatment was performed for Examples 1 to 3 and 36 to 38, and two-step heat treatment was performed for the other Examples. In the tables, conditions in the first step of the heat treatment are shown in the column "nucleus formation conditions," and conditions in the second step of the heat treatment are shown in the column "crystallization conditions." Temperatures and holding times at these temperatures are as shown in the tables.

The crystallized glass produced was cut and ground into a shape of 40 mm square and a thickness of more than 1 mm, and then cut and grinded by subjecting it to both-side parallel polishing to give a thickness of 1 mm, thereby obtaining a crystallized glass substrate.

Here, in Examples to which the column "chemical strengthening conditions" is applied, chemical strengthening was performed by immersing the crystallized glass after both-side parallel polishing into a KNO3 fused salt to obtain a crystallized glass substrate. The temperature of the immersion fused salt and immersion time are as shown in the column "chemical strengthening conditions" in the tables.

The visible light transmittance of the crystallized glass from the examples was obtained as follows: spectroscopic transmittance for the crystallized glass with a thickness of 1 mm subjected to both-side parallel polishing was scanned 240 nm or more and 800 nm or less using an U-4000 spectrophotometer from Hitachi High-Technologies Corporation, and then the values of spectral transmittance at 410 nm, 500 nm and 700 nm were determined from the scan. A value of transmittance includes reflection loss at the surface. In the tables, the differences in light transmittance at a wavelength of 700 nm and at a wavelength of 500 nm are shown in the column "ΔT1 (700, 500)", and the differences in light transmittance at a wavelength of 700 nm and at a wavelength of 410 nm are shown in the column "ΔT2 (700, 410)."

The compressive stress value and the thickness of the compressive stress layer of the crystallized glass substrate subjected to chemical strengthening were measured with an FSM-6000LE glass-surface stress meter from Orihara Manufacturing Co., LTD. As measurement conditions, calculation was performed with a refractive index of 1.54 and an optical elastic constant of 28.8 [(nm/cm)/MPa] for a sample.

Further, the Vickers hardness of the crystallized glass substrate from Example is expressed as a value of a load (N) divided by a surface area (mm2) in which the load is defined as a load when a pyramid-shaped dent is formed on a test surface using a diamond quadrangular-pyramid indenter with a facing angle of 136°, and the surface area is computed from the length of the dent. This was performed with a test load of 9.80 (N) and a holding time of 15 (seconds) using an MVK-E micro hardness tester from Akashi Seisakusho. For Examples to which the column "chemical strengthening conditions" is applied, substrates after chemical strengthening were used.

The crystal phase of the crystallized glass from Example before chemical strengthening was identified by peak angles observed in an X-ray diffraction pattern measured with an X-ray diffraction analyzer (X'PERT-MPD, Philips) and if needed, by TEMEDX (JEOL, JEM 2100F).

The "liquidus temperature" of the crystallized glass from Example was obtained as follows: a 30 cc cullet glass sample was placed into a 50 ml capacity platinum crucible, and completely melted at 1500° C. and heated to a predetermined temperature, and maintained for 12 hours, and then removed from a furnace for cooling. Subsequently the presence or absence of crystals in the surface and interior of the glass was observed. The lowest temperature at which no crystal was observed was then determined. Cooling to a predetermined temperature was performed down to 1200° C. with a temperature step of 10° C.

The viscosity of a glass melt was measured at the liquidus temperature and at 1400° C. with a ball raising-type viscometer (Opt Corp.).

For Examples where falling ball tests were performed, results are shown in the column "falling ball test height." The falling ball test height represents the maximum falling ball height where a test substrate with both-sides polished having a dimension of 40 mm square and a thickness of 1.3 mm, which was placed on a rubber sheet, tolerated the impact without breakage when a 130 g steel ball was dropped from a predetermined height. Tests were started from a drop height of 100 cm, and the height was then changed to 150 cm, 180 cm and so on if the substrate was not broken. Further, for Examples to which the column "chemical strengthening conditions" is applied, substrates after chemical strengthening were subjected to the tests.

Note that the height of 180 cm indicated in Example means that the substrate tolerated the impact without breakage when a steel ball was dropped from a height of 180 cm, but does not exclude a possibility where the substrate does not break when a ball is dropped from a height of higher than 180 cm.

TABLE 1

| mol % | Example 1 | Example 2 | Example 3 | Example 4 | Example 5 |
|---|---|---|---|---|---|
| $SiO_2$ | 58.395 | 58.238 | 58.004 | 60.887 | 57.608 |
| $Al_2O_3$ | 11.617 | 11.273 | 11.269 | 12.743 | 12.697 |
| $K_2O$ | | 1.695 | 1.626 | 2.541 | 1.664 |
| $Na_2O$ | 15.495 | 12.363 | 11.947 | 7.613 | 11.873 |
| MgO | 10.326 | 12.675 | 12.432 | 5.938 | 5.917 |
| CaO | | | 0.967 | | |
| ZnO | | | | 8.487 | 8.457 |
| $ZrO_2$ | | | | 1.11 | 1.106 |
| $TiO_2$ | 4.167 | 3.756 | 3.755 | | |
| $SnO_2$ | | | | 0.681 | 0.678 |
| Total | 100 | 100 | 100 | 100 | 100 |
| $Al_2O_3$/(MgO + ZnO) | 1.12 | 0.89 | 0.91 | 0.88 | 0.88 |
| $TiO_2$/$Na_2O$ | 0.27 | 0.3 | 0.31 | 0 | 0 |
| MgO/$Na_2O$ | 0.67 | 1.03 | 1.04 | 0.78 | 0.5 |
| ZnO/MgO | 0 | 0 | 0 | 1.43 | 1.43 |
| MgO + ZnO | 10.33 | 12.68 | 12.43 | 14.43 | 14.37 |
| Nucleus formation conditions | 650° C. × 5 h | 655° C. × 5 h | 650° C. × 5 h | 635° C. × 24 h | 635° C. × 24 h |
| Crystallization conditions | | | | 735° C. × 2 h | 735° C. × 2 h |
| Chemical strengthening conditions | — | — | 450° C. × 1 h | — | 450° C. × 6 h |
| Surface stress [Mpa] | — | — | 1205 | — | 1180 |
| Stress depth [μm] | — | — | 16 | — | 25 |
| Vickers hardness [Hv] | 690 | 700 | 730 | 700 | 690 |
| Crystal phase | $MgAl_2O_4$ $MgTi_2O_4$ | $MgAl_2O_4$ $MgTi_2O_4$ | $MgAl_2O_4$ $MgTi_2O_4$ | $ZnAl_2O_4$ $MgAl_2O_4$ | $ZnAl_2O_4$ $MgAl_2O_4$ |
| Transmittance (410 nm) [%] | 88.8 | 89.3 | 89.8 | 89.9 | 90.6 |
| Transmittance (500 nm) [%] | 89.9 | 90.4 | 90.7 | 91.1 | 91.2 |
| Transmittance (700 nm) [%] | 90.7 | 91.0 | 91.3 | 91.4 | 91.4 |
| ΔT1 (700, 500) [%] | 0.8 | 0.6 | 0.6 | 0.3 | 0.2 |
| ΔT2 (700, 410) [%] | 1.9 | 1.7 | 1.5 | 1.5 | 0.8 |
| Liquidus temperature [° C.] | 1260 | 1260 | 1260 | 1270 | 1260 |
| Viscosity at liquidus temperature [dPa · s] | 1489 | 1423 | 1414 | 1185 | 1176 |
| Viscosity at 1400° C. [dPa · s] | 302 | 251 | 256 | 416 | 382 |
| Falling ball test height [cm] | — | — | 180 | — | 150 |

TABLE 2

| mol % | Example 6 | Example 7 | Example 8 | Example 9 | Example 10 |
|---|---|---|---|---|---|
| $SiO_2$ | 56.12 | 55.579 | 55.342 | 55.342 | 54.572 |
| $P_2O_5$ | | | | | 0.487 |
| $Al_2O_3$ | 14.235 | 14.258 | 14.285 | 14.285 | 14.383 |
| $K_2O$ | 1.817 | 1.82 | 1.853 | 1.853 | 1.909 |
| $Na_2O$ | 10.991 | 11.008 | 10.985 | 10.985 | 10.994 |
| MgO | 5.946 | 5.955 | 5.966 | 5.966 | 6.007 |
| ZnO | 8.666 | 8.679 | 8.696 | 8.696 | 8.755 |
| $ZrO_2$ | 1.111 | 1.113 | 1.282 | 1.282 | 1.291 |
| $TiO_2$ | 1.114 | 1.588 | 1.591 | 1.591 | 1.602 |
| Total | 100 | 100 | 100 | 100 | 100 |
| $Al_2O_3$/(MgO + ZnO) | 0.97 | 0.97 | 0.97 | 0.97 | 0.97 |
| $TiO_2$/$Na_2O$ | 0.1 | 0.14 | 0.14 | 0.14 | 0.15 |
| MgO/$Na_2O$ | 0.54 | 0.54 | 0.54 | 0.54 | 0.55 |
| ZnO/MgO | 1.46 | 1.46 | 1.46 | 1.46 | 1.46 |
| MgO + ZnO | 14.61 | 14.63 | 14.66 | 14.66 | 14.76 |
| Nucleus formation conditions | 640° C. × 24 h | 635° C. × 24 h | 640° C. × 24 h | 635° C. × 24 h | 640° C. × 24 h |
| Crystallization conditions | 720° C. × 2 h | 735° C. × 2 h | 720° C. × 2 h | 735° C. × 2 h | 720° C. × 2 h |
| Chemical strengthening conditions | — | — | — | 450° C. × 6 h | 450° C. × 6 h |
| Surface stress [Mpa] | — | — | — | 1141 | 1138 |
| Stress depth [μm] | — | — | — | 28 | 25 |
| Vickers hardness [Hv] | 680 | 690 | 760 | 800 | 810 |
| Crystal phase | $ZnAl_2O_4$ $MgAl_2O_4$ | $ZnAl_2O_4$ $MgAl_2O_4$ | $Zn_2Al_4Si_5O_{18}$ $Mg_2Al_4Si_5O_{18}$ $ZnAl_2O_4$ $MgAl_2O_4$ | $Zn_2Al_4Si_5O_{18}$ $Mg_2Al_4Si_5O_{18}$ $ZnAl_2O_4$ $MgAl_2O_4$ | $Zn_2Al_4Si_5O_{18}$ $Mg_2Al_4Si_5O_{18}$ $ZnAl_2O_4$ $MgAl_2O_4$ |

TABLE 2-continued

| mol % | Example 6 | Example 7 | Example 8 | Example 9 | Example 10 |
|---|---|---|---|---|---|
| Transmittance (410 nm) [%] | 88.7 | 88.3 | 89.8 | 89.5 | 89.2 |
| Transmittance (500 nm) [%] | 90.0 | 89.3 | 90.7 | 90.4 | 90.3 |
| Transmittance (700 nm) [%] | 91.1 | 90.7 | 91.1 | 91.1 | 91.1 |
| ΔT1 (700, 500) [%] | 1.1 | 1.4 | 0.4 | 0.7 | 0.8 |
| ΔT2 (700, 410) [%] | 2.4 | 2.4 | 1.3 | 1.6 | 1.9 |
| Liquidus temperature [°C.] | 1270 | 1260 | 1260 | 1260 | 1260 |
| Viscosity at liquidus temperature [dPa · s] | 1191 | 1422 | 1513 | 1513 | 1504 |
| Viscosity at 1400° C. [dPa · s] | 275 | 258 | 265 | 265 | 261 |
| Falling ball test height [cm] | — | — | — | 180 | — |

TABLE 3

| mol % | Example 11 | Example 12 | Example 13 | Example 14 | Example 15 |
|---|---|---|---|---|---|
| $SiO_2$ | 54.572 | 54.572 | 54.344 | 54.284 | 53.878 |
| $P_2O_5$ | 0.487 | 0.487 | 0.488 | 0.488 | 0.507 |
| $Al_2O_3$ | 14.383 | 14.383 | 14.408 | 14.395 | 14.888 |
| $K_2O$ | 1.909 | 1.909 | 1.913 | 1.911 | 1.986 |
| $Na_2O$ | 10.994 | 10.994 | 10.991 | 10.992 | 10.969 |
| MgO | 6.007 | 6.007 | 6.018 | 6.012 | 0 |
| ZnO | 8.755 | 8.755 | 8.771 | 8.763 | 14.763 |
| $ZrO_2$ | 1.291 | 1.291 | 1.462 | 1.292 | 1.343 |
| $TiO_2$ | 1.602 | 1.602 | 1.605 | 1.863 | 1.666 |
| Total | 100 | 100 | 100 | 100 | 100 |
| $Al_2O_3$/(MgO + ZnO) | 0.97 | 0.97 | 0.97 | 0.97 | 1.01 |
| $TiO_2$/$Na_2O$ | 0.15 | 0.15 | 0.15 | 0.17 | 0.15 |
| MgO/$Na_2O$ | 0.55 | 0.55 | 0.55 | 0.55 | 0 |
| ZnO/MgO | 1.46 | 1.46 | 1.46 | 1.46 | — |
| MgO + ZnO | 14.76 | 14.76 | 14.79 | 14.78 | 14.76 |
| Nucleus formation conditions | 650° C. × 10 h | 650° C. × 5 h | 635° C. × 24 h | 635° C. × 24 h | 640° C. × 24 h |
| Crystallization conditions | 750° C. × 3 h | 790° C. × 3 h | 735° C. × 2 h | 735° C. × 2 h | 720° C. × 2 h |
| Chemical strengthening conditions | 450° C. × 6 h | 450° C. × 6 h | — | — | — |
| Surface stress [Mpa] | 1156 | 1152 | — | — | — |
| Stress depth [μm] | 40 | 41 | — | — | — |
| Vickers hardness [Hv] | 810 | 830 | 740 | 720 | 740 |
| Crystal phase | $ZnAl_2O_4$ $MgAl_2O_4$ | $ZnAl_2O_4$ $MgAl_2O_4$ | $Zn_2SiO_4$ $Mg_2SiO_4$ | $Zn_2SiO_4$ $Mg_2SiO_4$ | $Zn_2SiO_4$ $ZnTiO_3$ |
| Transmittance (410 nm) [%] | 85.5 | 87.0 | 88.4 | 88.4 | 88.1 |
| Transmittance (500 nm) [%] | 88.9 | 88.9 | 89.8 | 89.2 | 90.3 |
| Transmittance (700 nm) [%] | 90.4 | 90.4 | 90.9 | 90.7 | 90.9 |
| ΔT1 (700, 500) [%] | 1.5 | 1.5 | 1.1 | 1.5 | 0.6 |
| ΔT2 (700, 410) [%] | 4.9 | 3.4 | 2.5 | 2.3 | 2.8 |
| Liquidus temperature [° C.] | 1260 | 1260 | 1270 | 1280 | 1290 |
| Viscosity at liquidus temperature [dPa · s] | 1504 | 1504 | 1230 | 1125 | 1005 |
| Viscosity at 1400° C. [dPa · s] | 261 | 261 | 268 | 268 | 265 |
| Falling ball test height [cm] | 180 | — | — | — | — |

TABLE 4

| mol % | Example 16 | Example 17 | Example 18 | Example 19 | Example 20 |
|---|---|---|---|---|---|
| $SiO_2$ | 54.057 | 54.057 | 53.909 | 54.599 | 54.769 |
| $P_2O_5$ | 0.489 | 0.489 | 0.496 | 0.51 | 0.505 |
| $Al_2O_3$ | 14.421 | 14.421 | 14.641 | 14.97 | 14.82 |

TABLE 4-continued

| mol % | Example 16 | Example 17 | Example 18 | Example 19 | Example 20 |
|---|---|---|---|---|---|
| $K_2O$ | 1.914 | 1.914 | 1.944 | 2.035 | 1.977 |
| $Na_2O$ | 10.989 | 10.989 | 10.998 | 10.971 | 10.977 |
| MgO | 6.023 | 6.023 | 3.494 | | |
| ZnO | 8.778 | 8.778 | 11.309 | 14.845 | 14.696 |
| $ZrO_2$ | 1.463 | 1.463 | 1.314 | 1.35 | 1.046 |
| $TiO_2$ | 1.866 | 1.866 | 1.895 | | 1.21 |
| $SnO_2$ | | | | 0.72 | |
| Total | 100 | 100 | 100 | 100 | 100 |
| $Al_2O_3/(MgO + ZnO)$ | 0.97 | 0.97 | 0.99 | 1.01 | 1.01 |
| $TiO_2/Na_2O$ | 0.17 | 0.17 | 0.17 | 0 | 0.11 |
| $MgO/Na_2O$ | 0.55 | 0.55 | 0.32 | 0 | 0 |
| ZnO/MgO | 1.46 | 1.46 | 3.24 | — | — |
| MgO + ZnO | 14.8 | 14.8 | 14.8 | 14.85 | 14.7 |
| Nucleus formation conditions | 640° C. × 24 h | 645° C. × 24 h | 630° C. × 5 h | 640° C. × 24 h | 640° C. × 24 h |
| Crystallization conditions | 720° C. × 2 h | 795° C. × 2 h | 730° C. × 3 h | 700° C. × 2 h | 690° C. × 2 h |
| Chemical strengthening conditions | — | — | 450° C. × 6 h | — | — |
| Surface stress [Mpa] | — | — | 1035 | — | — |
| Stress depth [μm] | — | — | 40 | — | — |
| Vickers hardness [Hv] | 750 | 780 | 740 | 710 | 730 |
| Crystal phase | $Zn_2Al_4Si_5O_{18}$ $Mg_2Al_4Si_5O_{18}$ | $ZnAl_2O_4$ $MgAl_2O_4$ | $ZnAl_2O_4$ | $Zn_2SiO_4$ | $Zn_2SiO_4$ |
| Transmittance (410 nm) [%] | 89.0 | 88.2 | 85.1 | 85.2 | 85.3 |
| Transmittance (500 nm) [%] | 90.4 | 89.2 | 88.6 | 88.7 | 88.7 |
| Transmittance (700 nm) [%] | 91.0 | 90.7 | 90.1 | 90.2 | 90.1 |
| ΔT1 (700, 500) [%] | 0.6 | 1.5 | 1.5 | 1.5 | 1.4 |
| ΔT2 (700, 410) [%] | 2.0 | 2.5 | 5.0 | 5.0 | 4.8 |
| Liquidus temperature [° C.] | 1280 | 1280 | 1280 | 1290 | 1290 |
| Viscosity at liquidus temperature [dPa · s] | 1071 | 1071 | 1174 | 1318 | 895 |
| Viscosity at 1400° C. [dPa · s] | 251 | 251 | 258 | 363 | 263 |
| Falling ball test height [cm] | — | — | 150 | — | — |

TABLE 5

| mol % | Example 21 | Example 22 | Example 23 | Example 24 | Example 25 |
|---|---|---|---|---|---|
| $SiO_2$ | 53.756 | 54.374 | 54.32 | 55.02 | 54.326 |
| $P_2O_5$ | 0.489 | 0.508 | 0.509 | 0.499 | 0.496 |
| $Al_2O_3$ | 14.433 | 14.925 | 14.943 | 14.656 | 14.86 |
| $K_2O$ | 1.916 | 2.641 | 2.66 | 2.594 | 2.678 |
| $Na_2O$ | 10.998 | 10.996 | 10.986 | 10.992 | 10.995 |
| MgO | 6.028 | | | 2.636 | 4.161 |
| ZnO | 8.786 | 14.8 | 14.818 | 11.879 | 10.651 |
| $ZrO_2$ | 1.465 | 1.756 | 1.524 | 1.724 | 1.716 |
| $TiO_2$ | 2.129 | | | | |
| $SnO_2$ | | | 0.24 | | 0.117 |
| Total | 100 | 100 | 100 | 100 | 100 |
| $Al_2O_3/(MgO + ZnO)$ | 0.97 | 1.01 | 1.01 | 1.01 | 1 |
| $TiO_2/Na_2O$ | 0.19 | 0 | 0 | 0 | 0 |
| $MgO/Na_2O$ | 0.55 | 0 | 0 | 0.24 | 0.38 |
| ZnO/MgO | 1.46 | — | — | 4.51 | 2.56 |
| MgO + ZnO | 14.81 | 14.8 | 14.82 | 14.52 | 14.81 |
| Nucleus formation conditions | 640° C. × 24 h | 650° C. × 10 h | 650° C. × 10 h | 650° C. × 10 h | 650° C. × 10 h |
| Crystallization conditions | 720° C. × 2 h | 700° C. × 3 h | 700° C. × 3 h | 700° C. × 3 h | 700° C. × 3 h |
| Chemical strengthening conditions | — | — | — | — | — |
| Surface stress [Mpa] | — | — | — | — | — |
| Stress depth [μm] | — | — | — | — | — |
| Vickers hardness [Hv] | 780 | 760 | 770 | 740 | 760 |

TABLE 5-continued

| mol % | Example 21 | Example 22 | Example 23 | Example 24 | Example 25 |
|---|---|---|---|---|---|
| Crystal phase | $Zn_2Al_4Si_5O_{18}$ $Mg_2Al_4Si_5O_{18}$ | $Zn_2SiO_4$ | $Zn_2SiO_4$ | $Zn_2SiO_4$ $Mg_2SiO_4$ | $Zn_2SiO_4$ $Mg_2SiO_4$ |
| Transmittance (410 nm) [%] | 88.0 | 85.2 | 85.2 | 85.3 | 85.3 |
| Transmittance (500 nm) [%] | 89.0 | 88.7 | 88.8 | 88.6 | 88.8 |
| Transmittance (700 nm) [%] | 90.5 | 90.1 | 90.2 | 90.1 | 90.3 |
| ΔT1 (700, 500) [%] | 1.5 | 1.4 | 1.4 | 1.5 | 1.5 |
| ΔT2 (700, 410) [%] | 2.5 | 4.9 | 5.0 | 4.8 | 5.0 |
| Liquidus temperature [° C.] | 1340 | 1300 | 1290 | 1300 | 1290 |
| Viscosity at liquidus temperature [dPa · s] | 501 | 1202 | 1318 | 1206 | 1318 |
| Viscosity at 1400° C. [dPa·s] | 250 | 355 | 380 | 378 | 369 |
| Falling ball test height [cm] | — | — | — | — | — |

TABLE 6

| mol % | Example 26 | Example 27 | Example 28 | Example 29 | Example 30 |
|---|---|---|---|---|---|
| $SiO_2$ | 53.488 | 54.75 | 55.05 | 55.04 | 55.16 |
| $P_2O_5$ | 0.5 | 0.49 | | | |
| $Al_2O_3$ | 14.954 | 14.47 | 14.21 | 14.21 | 14.24 |
| $Li_2O$ | | | | | 0.46 |
| $K_2O$ | 2.748 | 2.357 | 1.84 | 1.84 | 1.82 |
| $Na_2O$ | 10.984 | 10.995 | 10.93 | 10.93 | 10.83 |
| MgO | 4.188 | 6.043 | 5.94 | 5.93 | 5.95 |
| ZnO | 10.718 | 8.765 | 8.65 | 8.65 | 8.67 |
| $ZrO_2$ | 2.302 | 2.061 | 1.28 | 1.28 | 1.28 |
| $TiO_2$ | | | 1.58 | 1.58 | 1.59 |
| $Y_2O_3$ | | | | 0.54 | |
| $SnO_2$ | 0.118 | 0.069 | | | |
| $La_2O_3$ | | | 0.52 | | |
| Total | 100 | 100 | 100 | 100 | 100 |
| $Al_2O_3$/(MgO + ZnO) | 1 | 0.98 | 0.97 | 0.97 | 0.97 |
| $TiO_2$/$Na_2O$ | 0 | 0 | 0.14 | 0.14 | 0.15 |
| MgO/$Na_2O$ | 0.38 | 0.55 | 0.54 | 0.54 | 0.55 |
| ZnO/MgO | 2.56 | 1.45 | 1.46 | 1.46 | 1.46 |
| MgO + ZnO | 14.91 | 14.81 | 14.59 | 14.58 | 14.62 |
| Nucleus formation conditions | 650° C. × 10 h | 650° C. × 10 h | 650° C. × 10 h | 650° C. × 10 h | 650° C. × 10 h |
| Crystallization conditions | 710° C. × 3 h | 690° C. × 3 h | 750° C. × 2 h | 750° C. × 2 h | 700° C. × 2 h |
| Chemical strengthening conditions | — | — | — | — | — |
| Surface stress [Mpa] | — | — | — | — | — |
| Stress depth [μm] | — | — | — | — | — |
| Vickers hardness [Hv] | 770 | 750 | 790 | 790 | 770 |
| Crystal phase | $Zn_2SiO_4$ $Mg_2SiO_4$ | $Zn_2SiO_4$ $Mg_2SiO_4$ | $Zn_2SiO_4$ $Mg_2SiO_4$ | $Zn_2SiO_4$ $Mg_2SiO_4$ | $Zn_2SiO_4$ $Mg_2SiO_4$ |
| Transmittance (410 nm) [%] | 85.4 | 85.1 | 89.5 | 88.7 | 89.0 |
| Transmittance (500 nm) [%] | 88.9 | 88.6 | 90.4 | 90.1 | 90.2 |
| Transmittance (700 nm) [%] | 90.4 | 90.1 | 91.1 | 91.1 | 90.9 |
| ΔT1 (700, 500) [%] | 1.5 | 1.5 | 0.7 | 1.0 | 0.7 |
| ΔT2 (700, 410) [%] | 5.0 | 5.0 | 1.6 | 2.4 | 1.9 |
| Liquidus temperature [° C.] | 1320 | 1310 | 1280 | 1280 | 1270 |
| Viscosity at liquidus temperature [dPa · s] | 1002 | 1071 | 1485 | 1481 | 1498 |
| Viscosity at 1400° C. [dPa · s] | 389 | 385 | 253 | 251 | 252 |
| Falling ball test height [cm] | — | — | — | — | — |

TABLE 7

| mol % | Example 31 | Example 32 | Example 33 | Example 34 | Example 35 |
|---|---|---|---|---|---|
| $SiO_2$ | 55.88 | 55.92 | 55.75 | 64.79 | 50.39 |
| $P_2O_5$ | | | | | 2.07 |
| $Al_2O_3$ | 14.42 | 14.43 | 14.39 | 9.01 | 12.44 |
| $K_2O$ | 1.47 | 1.47 | 1.47 | 1.73 | 0.11 |
| $Na_2O$ | 10.64 | 10.64 | 10.61 | 11.60 | 20.08 |
| MgO | 5.16 | 5.17 | 5.15 | 3.30 | 4.80 |
| BaO | | 0.45 | | | |
| SrO | 0.54 | | | | |
| ZnO | 8.52 | 8.53 | 8.51 | 6.79 | 7.22 |
| $ZrO_2$ | 1.29 | 1.3 | 1.29 | 1.24 | 1.29 |
| $TiO_2$ | 1.61 | 1.61 | 1.6 | 1.54 | 1.6 |
| FeO | | | | 0.02 | |
| $CeO_2$ | | | | 0.01 | |
| $Ta_2O_5$ | | 0.48 | | | |
| $Nb_2O_3$ | 0.47 | | | | |
| $WO_3$ | | | | 1.2 | |
| Total | 100 | 100 | 100 | 100 | 100 |
| $Al_2O_3$/(MgO + ZnO) | 1.05 | 1.05 | 1.05 | 0.89 | 1.04 |
| $TiO_2$/$Na_2O$ | 0.15 | 0.15 | 0.15 | 0.13 | 0.08 |
| MgO/$Na_2O$ | 0.48 | 0.49 | 0.49 | 0.28 | 0.24 |
| ZnO/MgO | 1.65 | 1.65 | 1.65 | 2.06 | 1.50 |
| MgO + ZnO | 13.68 | 13.7 | 13.66 | 10.09 | 12.02 |
| Nucleus formation conditions | 650° C. × 10 h | 650° C. × 10 h | 650° C. × 10 h | 650° C. × 10 h | 650° C. × 10 h |
| Crystallization conditions | 750° C. × 2 h | 750° C. × 2 h | 750° C. × 2 h | 750° C. × 2 h | 750° C. × 2 h |
| Chemical strengthening conditions | — | — | — | | |
| Surface stress [Mpa] | — | — | — | | |
| Stress depth [μm] | — | — | — | | |
| Vickers hardness [Hv] | 780 | 790 | 760 | 780 | 730 |
| Crystal phase | $Zn_2SiO_4$ $Mg_2SiO_4$ | $Zn_2SiO_4$ $Mg_2SiO_4$ | $Zn_2SiO_4$ $Mg_2SiO_4$ | $ZnAl_2O_4$ $MgAl_2O_4$ | $ZnAl_2O_4$ $MgAl_2O_4$ |
| Transmittance (410 nm) [%] | 89.1 | 89.3 | 85.4 | 89.2 | 88.6 |
| Transmittance (500 nm) [%] | 90.1 | 90.0 | 88.8 | 90.1 | 89.0 |
| Transmittance (700 nm) [%] | 90.8 | 90.9 | 90.3 | 90.8 | 90.1 |
| ΔT1 (700, 500) [%] | 0.7 | 0.9 | 1.5 | 0.7 | 1.1 |
| ΔT2 (700, 410) [%] | 1.7 | 1.6 | 4.9 | 1.6 | 1.5 |
| Liquidus temperature [° C.] | 1270 | 1280 | 1270 | 1290 | 1270 |
| Viscosity at liquidus temperature [dPa · s] | 1491 | 1475 | 1491 | 1525 | 1398 |
| Viscosity at 1400° C. [dPa · s] | 255 | 2.53 | 255 | 399 | 238 |
| Falling ball test height [cm] | — | — | — | — | — |

TABLE 8

| mol % | Example 36 | Example 37 | Example 38 |
|---|---|---|---|
| $SiO_2$ | 57.954 | 57.762 | 57.950 |
| $Al_2O_3$ | 11.273 | 11.236 | 11.272 |
| $K_2O$ | 1.629 | 1.623 | 1.629 |
| $Na_2O$ | 11.956 | 11.917 | 11.956 |
| MgO | 12.442 | 12.401 | 12.441 |
| CaO | 0.971 | 0.968 | 0.971 |
| ZnO | | | |
| $ZrO_2$ | | | |
| $TiO_2$ | 3.756 | 3.743 | 3.755 |
| $Sb_2O_3$ | 0.019 | 0.350 | |
| $As_2O_3$ | | | 0.026 |
| Total | 100 | 100 | 100 |
| $Al_2O_3$/(MgO + ZnO) | 0.91 | 0.91 | 0.91 |
| $TiO_2$/$Na_2O$ | 0.31 | 0.31 | 0.31 |
| MgO/$Na_2O$ | 1.04 | 1.04 | 1.04 |
| ZnO/MgO | 0 | 0 | 0 |
| MgO + ZnO | 12.44 | 12.40 | 12.44 |
| Nucleus formation conditions | 650° C. × 5 h | 650° C. × 5 h | 650° C. × 5 h |
| Crystallization conditions | | | |
| Chemical strengthening conditions | 450° C. × 1 h | 450° C. × 1 h | 450° C. × 1 h |
| Surface stress [Mpa] | 1207 | 1203 | 1205 |
| Stress depth [μm] | 17 | 16 | 16 |
| Vickers hardness [Hv] | 730 | 730 | 730 |
| Crystal phase | $MgAl_2O_4$ $MgTi_2O_4$ | $MgAl_2O_4$ $MgTi_2O_4$ | $MgAl_2O_4$ $MgTi_2O_4$ |
| Transmittance (410 nm) [%] | 89.9 | 89.9 | 89.9 |
| Transmittance (500 nm) [%] | 90.9 | 90.9 | 90.9 |
| Transmittance (700 nm) [%] | 91.4 | 91.4 | 91.3 |
| ΔT1 (700, 500) [%] | 0.5 | 0.5 | 0.4 |
| ΔT2 (700, 410) [%] | 1.5 | 1.5 | 1.5 |
| Liquidus temperature [° C.] | 1270 | 1270 | 1270 |
| Viscosity at liquidus temperature [dPa · s] | 1414 | 1417 | 1417 |
| Viscosity at 1400° C. [dPa · s] | 256 | 256 | 256 |
| Falling ball test height [cm] | 180 | — | 180 |

As demonstrated in the tables, the crystallized glasses from Examples according to the present invention can show a desired transmission and color balance.

Consequently, for each of the crystallized glasses from Examples according to the present invention, the light transmittance across a thickness of 1 mm at a wavelength of 500 nm was more than 85%. Further, for each of them, the difference in light transmittance across a thickness of 1 mm at a wavelength of 700 nm and at a wavelength of 500 nm was within 1.5%. Moreover, for each of them, the difference in light transmittance at a wavelength of 700 nm and at a wavelength of 410 nm was within 5.0%. Therefore, these results clearly show that the crystallized glasses from Examples according to the present invention have excellent visible light transmittance and color balance.

Moreover, the crystallized glasses from Examples according to the present invention can comprise a desired crystal phase while maintaining excellent devitrification resistance on melting, meltability and shapability.

As clearly shown above, in the case of the substrate according to the present invention, a high compressive stress can be obtained by virtue of chemical strengthening, and a compressive stress layer can be deeply formed in a short time even though the substrate comprises a crystallized glass.

Therefore, the crystallized glasses and substrates from Examples according to the present invention are demonstrated to have a desired transmission and color balance, and also have a high mechanical strength.

Hereinbefore, the present invention is described in detail for the purpose of illustration. Examples herein are provided for the purpose of illustration only. It will be understood that a person skilled in the art can make various modifications without departing from the spirit and scope of the present invention.

What is claimed is:

1. A crystallized glass substrate comprising a crystallized glass as a base material, and having a compressive stress layer in a surface thereof, wherein the compressive stress layer has a compressive stress value of 800 MPa or more; and
the crystallized glass comprises, in terms of mol % on an oxide basis:
an SiO2 component of 30.0% or more and 70.0% or less,
an $Al_2O_3$ component of 8.0% or more and 25.0% or less,
an $Na_2O$ component of 6.0% or more and 25.0% or less,
an MgO component of 0% or more and 25.0% or less,
an ZnO component of 0% or more and 10.0% or less,
a $TiO_2$ component of 0% or more and 10.0% or less, and
a $B_2O_3$ component of 0% or more and less than 2.0%,
the molar ratio [$Al_2O_3$/(MgO+ZnO)] having a value of 0.5 or more and 2.0 or less, and
comprises one or more selected from $RAl_2O_4$, $RTi_2O_5$, $R_2TiO_4$, $R_2SiO_4$, $RAl_2Si_2O_8$, $R_2Al_4Si_5O_{18}$ and $MgTi_2O_4$ as a crystal phase, provided that R is one or more selected from Zn, Mg and Fe.

2. The crystallized glass substrate according to claim 1, wherein the molar ratio [$TiO_2$/$Na_2O$] of the $TiO_2$ component to the $Na_2O$ component in terms of mol % on an oxide basis of the crystallized glass has a value of 0 or more and 0.41 or less.

3. The crystallized glass substrate according to claim 1, wherein the molar ratio [MgO/$Na_2O$] of the MgO component to the $Na_2O$ component in terms of mol % on an oxide basis of the crystallized glass has a value of 0 or more and 1.60 or less.

4. The crystallized glass substrate according to claim 1, wherein a light transmittance across a thickness of 1 mm at a wavelength of 500 nm including reflectance loss of the crystallized glass is more than 50%.

5. The crystallized glass substrate according to claim 1, wherein the difference in light transmittance across a thickness of 1 mm including reflectance loss at a wavelength of 700 nm and at a wavelength of 500 nm of the crystallized glass is within 2.0%, and the difference in light transmittance across a thickness of 1 mm including reflection loss at a wavelength of 700 nm and at a wavelength of 410 nm of the crystallized glass is within 6.0%.

6. The crystallized glass substrate according to claim 1, wherein the total value of the content of the MgO component and the content of the ZnO component of the crystallized glass is 1.0% or more and 30.0% or less in terms of mol % on an oxide basis.

7. The crystallized glass substrate according to claim 1, the crystallized glass comprising, in terms of mol % on an oxide basis:
a $P_2O_5$ component of 0% or more and 10.0% or less,
a $K_2O$ component of 0% or more and 20.0% or less,
a CaO component of 0% or more and 10.0% or less,
a BaO component of 0% or more and 10.0% or less,
an FeO component of 0% or more and 8% or less,
a $ZrO_2$ component of 0% or more and 10.0% or less, and
an $SnO_2$ component of 0% or more and 5.0% or less.

8. The crystallized glass substrate according to claim 1, the crystallized glass comprising, in terms of mol % on an oxide basis:
an $Li_2O$ component of 0% or more and 10.0% or less,
an SrO component of 0% or more and 10.0% or less,
an $La_2O_3$ component of 0% or more and 3% or less,
a $Y_2O_3$ component of 0% or more and 3% or less,
an $Nb_2O_5$ component of 0% or more and 5% or less,
a $Ta_2O_5$ component of 0% or more and 5% or less, and
a WO3 component of 0% or more and 5% or less.

9. The crystallized glass substrate according to claim 1, wherein the compressive stress layer has a thickness of 1 μm or more.

10. The crystallized glass substrate according to claim 1, wherein the content of the $B_2O_3$ component of the crystallized glass is 0 mol %.

11. The crystallized glass substrate according to claim 1, the crystallized glass further comprising a clarifier selected from a $SnO_2$ component and a $Sb_2O_3$ component in an amount of at most 1.0 mol %.

12. The crystallized glass substrate according to claim 1, the crystallized glass further comprising a $Sb_2O_3$ component in an amount of at most 1.0 mol %.

13. A crystallized glass substrate comprising a crystallized glass as a base material, and having a compressive stress layer in a surface thereof, wherein the compressive stress layer has a compressive stress value of 800 MPa or more; and
the crystallized glass comprises, in terms of mol % on an oxide basis:
an $SiO_2$ component of 30.0% or more and 70.0% or less,
an $Al_2O_3$ component of 8.0% or more and 25.0% or less,
an $Na_2O$ component of 10.61% or more and 25.0% or less,
an MgO component of 0% or more and 25.0% or less,
an ZnO component of 0% or more and 30.0% or less,
a $TiO_2$ component of 0% or more and 10.0% or less, and
a $B_2O_3$ component of 0% or more and less than 2.0%,
the molar ratio [$Al_2O_3$/(MgO+ZnO)] having a value of 0.5 or more and 2.0 or less, and comprises one or more selected from $RAl_2O_4$, $RTi_2O_5$, $R_2TiO_4$, $R_2SiO_4$, $RAl_2Si_2O_8$, $R_2Al_4Si_5O_{18}$ and $MgTi_2O_4$ as a crystal phase, provided that R is one or more selected from Zn, Mg and Fe.

14. A crystallized glass substrate comprising a crystallized glass as a base material, and having a compressive stress layer in a surface thereof, wherein the compressive stress layer has a compressive stress value of 800 MPa or more; and the crystallized glass comprises, in terms of mol % on an oxide basis:
an $SiO_2$ component of 30.0% or more and 70.0% or less,
an $Al_2O_3$ component of 8.0% or more and 25.0% or less,
an $Na_2O$ component of 6.0% or more and 25.0% or less,
an MgO component of 0% or more and 25.0% or less,
an ZnO component of 0% or more and 30.0% or less,
a $TiO_2$ component of 0% or more and 10.0% or less,
a $B_2O_3$ component of 0% or more and less than 2.0%, and
a $Sb_2O_3$ component of more than 0% and 1.0% or less,
the molar ratio $[Al_2O_3/(MgO+ZnO)]$ having a value of 0.5 or more and 2.0 or less, and
comprises one or more selected from $RAl_2O_4$, $RTi_2O_5$, $R_2TiO_4$, $R_2SiO_4$, $RAl_2Si_2O_8$, $R_2Al_4Si_5O_{18}$ and $MgTi_2O_4$ as a crystal phase, provided that R is one or more selected from Zn, Mg and Fe.

* * * * *